Sept. 8, 1953     W. T. STOCKETT, JR     2,651,334
SPOOL-AND-CHAIN LOG STOP AND KICKER
Filed Jan. 26, 1952
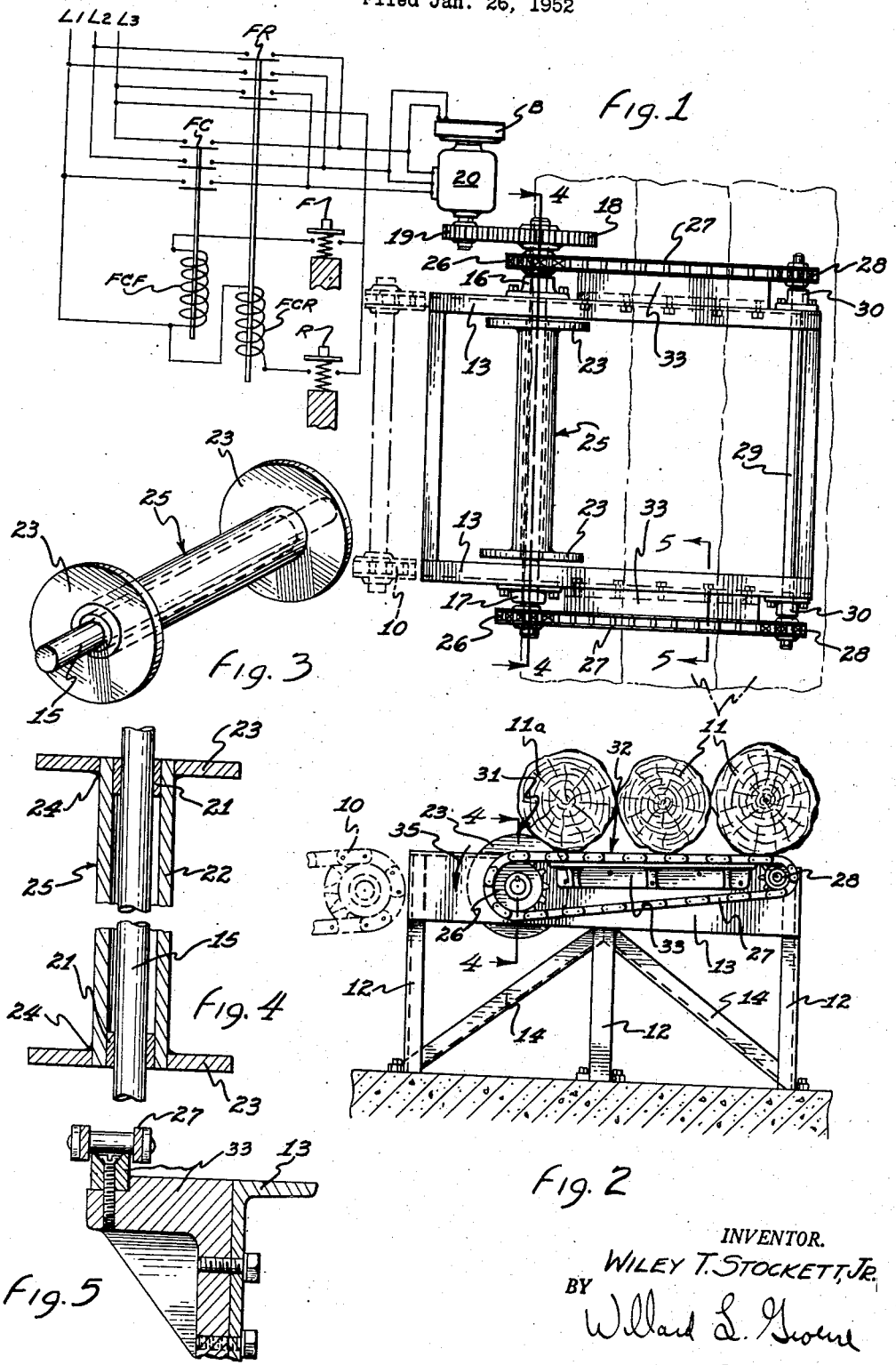
INVENTOR.
WILEY T. STOCKETT, JR.
BY Willard L. Groene
ATTORNEY.

Patented Sept. 8, 1953

2,651,334

UNITED STATES PATENT OFFICE 2,651,334

SPOOL-AND-CHAIN LOG STOP AND KICKER

Wiley T. Stockett, Jr., Woodruff, Ariz.

Application January 26, 1952, Serial No. 268,411

6 Claims. (Cl. 143—95)

1

This invention pertains to improvements in log stop and kicker mechanism for use in conjunction with saw mill apparatus.

More particularly this invention pertains to improvements in a log stop and kicker utilized in conjunction with log turners associated with saw mill carriages of large saw mill rip sawing equipment.

One of the objects of this invention is to provide an improved simplified and highly efficient log stop and kicker which is economical to manufacture and which at the same time is simple in design and fool proof in operation.

Still another object of this invention is to provide an improved and simplified log stop and kicker which may be energized by a suitable source of power, such as an electric motor, for presenting logs to position to be received by a log turner or other apparatus associated with a saw mill carriage.

Still another object of this invention is to provide a push button control electrically operated log stop and kicker which may be controlled by the operator to present successive logs to a saw mill carriage or to arrest a series of logs to be cut that are resting upon the initial loading deck.

Still another object of this invention is to provide an improved log stop and kicker mechanism having a pair of chain tracks power driven from an electric control source in conjunction with a freely rotating spool acting as the detent delaying or positioning device in such a way that energizing of the chain one direction or the other straightens up the logs and intermittently presents them to the saw carriage as desired.

Further features and advantages of this invention will appear from a detailed description of the drawings in which:

Fig. 1 is a plan view of a log stop and kicker mechanism incorporating the features of this invention.

Fig. 2 is a side elevation of the apparatus shown in Fig. 1.

Fig. 3 is a perspective view of the log stop and detent spool of the novel apparatus.

Fig. 4 is an enlarged fragmentary sectional view on the line 4—4 of Figs. 1 and 2.

Fig. 5 is a section on the line 5—5 of Fig. 2.

For illustrative purposes this invention is shown applied in connection with log turning apparatus indicated generally at 10, such for example as illustrated in my co-pending patent application, Serial No. 229,020, filed May 31, 1951, and to log stop and kicker mechanism such as shown in my co-pending patent application, Serial No. 242,332, filed August 17, 1951. The ob-

2 ject of the present invention is to provide apparatus for periodically and selectively at the will of the operator placing of logs 11 to be sawed on to the log turner 10 whereupon the logs are then properly handled with regard to the usual saw mill carriage and rip saw not shown. This apparatus comprises a frame structure consisting of vertical upright supporting legs 12 which are suitably connected to side frame members 13 and made relatively to one another by means of suitable cross bracing 14.

A log stop and kicker comprises a main drive or spool shaft 15 suitably journaled in bearings 16 and 17 on the side frames 13 and is connected thru a gear 18 fixed on the shaft 15 with a pinion 19 on the reversible drive motor 20.

Journaled on the shaft 15 on suitable bearing bushings 21 fixed in the tube 22 are the log stop discs 23 suitably secured as by welding 24 to the tube 22 so that the discs 23 and tube 22 function as a freely rotating spool co-axial with the drive shaft 15.

Fixed on the shaft 15 closely adjacent the spool discs 23 are the roller chain sprockets 26 over which operate the log supporting and moving roller chains 27 and which operate over idler sprockets 28 carried on an idler shaft or by other suitable means 29 journaled on the bearings 30 carried in the side frame member 13. The upper line of the chains 27 is supported on guide rails 33 for free rolling longitudinal movement of the chains 27 on the side frame members 13, as best seen in Fig. 5.

Preferably the drive motor 20 may be push button controlled for either one or the other direction of rotation by a suitable power supply and control circuit, as best illustrated in an elementary manner in Fig. 1, wherein a series of three phase power lines L1, L2 and L3 are connected for forward operation of the motor 20 thru the forward contactor FC operated by its relay coil FCF. When the forward push button F is pressed and which may be operated in the reverse direction by the reverse contactor FR when its coil FCR is energized when the reverse push button R is pressed. Preferably a suitable well known commercial magnetic brake B may be utilized in conjunction with the motor so that when the motor is de-energized it may be automatically substantially instantly stopped for accurately arresting movement of the chains and the presentation or removal of logs from their contact position with the discs 23 of the spool assembly 25.

It is important to note that in this arrangement a critical relationship is provided between the top portion 31 of the discs 23 of the spool 25 and the top contacting surface area 32 of the chains 27 so that when the chains are stationary a log such as 11a will be detained and held against the periphery of the discs 23 as shown in Fig. 2. However when the chains are operated in forward direction such as indicated by the arrow 35 in Fig. 2 the log wil be given sufficient thrust and inertia to cause it to roll over the top portion 31 of the discs 23 because of their free rotation on the journal bearings 21 as described. At any time by reversal of movement of the chains 27 the logs may be arrested or moved backward from the detaining discs 23 to await the sawing of the log just deposited on the saw carriage 10.

Various sizes of discs 23 may be utilized and the diameter varied to vary the position of the point 31 with regard to the chains at the surface 32 depending upon the size and nature of logs to be handled by this mechanism.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed as new and desired to be obtained by United States Letters Patent is:

1. A log stop and kicker mechanism including a frame, a main shaft journaled in said frame, a log stop and kicker spool journaled on said shaft for independent rotation thereon, a plurality of sprockets fixed on said shaft, a plurality of log supporting and moving chains operating over said sprockets, idler sprocket means at the opposite ends of said chains journaled on said frame, and supporting means for the intermediate portions of said chains facing upwardly between said main shaft and said idler sprockets to carry logs placed on said chains to and from engaging position with said spool, and power means for driving said main shaft.

2. A log stop and kicker mechanism including a main drive shaft, a log stop and kicker spool comprising a tubular shaft portion journaled for free rotation on said main drive shaft, a pair of circular disc members spaced at each end of and rigidly fixed to said tubular portion, a pair of log moving chains located each side of said spool, a pair of chain supporting sprockets fixed on said main drive shaft one closely adjacent each of the outside faces of said discs, and power means connected to said drive shaft for actuating said chains in horizontal movement to present or remove logs from engagement with the periphery of said discs of said log stop and kicker spool.

3. A log stop and kicker including, a frame, a main shaft journaled on said frame, a log stop and kicker spool comprising a tubular shaft journaled for free rotation on said main shaft, a plurality of spaced discs having peripheral detaining surfaces on the outside diameter thereof fixed at spaced positions on said tubular shaft, power means for rotating said main shaft, a plurality of log supporting and actuating endless looped chains slidably supported on a frame, chain supporting sprockets for one of the looped ends of said chains fixed on said main shaft operatively engaging said chains for movement of said chains about the axis of rotation of said shaft and spool, and idler chain sprockets, supporting the opposite looped ends of said chains from said main shaft and spool, journaled on said frame.

4. In a log stop and kicker mechanism, a supporting frame deck, a main shaft journaled in said frame for rotation about a horizontal axis, log stop and kicker apparatus on said shaft comprising a spool member having a tubular shaft journaled for free rotation on said main shaft, and a pair of spaced discs fixed one at each end of said tubular shaft, power means connected to, reversibly driving, and instantly arresting rotation of, said main shaft, a plurality of endless looped chains, chain supporting sprockets for one of the looped ends of said chains fixed on said main shaft adjacent said disc members, chain supporting idler sprocket means on said frame for supporting the other looped ends of said chains, and push button control means to control said power means operable to effect the actuation of said shaft.

5. A log stop and kicker mechanism including a supporting frame deck, a main shaft journaled in said frame for rotation about a horizontal axis, stop and kicker apparatus on said shaft comprising a spool member freely journaled for rotation about the axis of said shaft, discs on said spool mechanism having peripheral surfaces for engaging the logs to be controlled by said apparatus, a pair of sprockets fixed on said shaft of smaller diameters than said discs, a pair of idler sprockets journaled on said frame, chain means operating over said sprockets, support means intermediate said idler and drive sprockets on said drive shaft for receiving a vertical load applied by the presentation of logs on said chains, and power means for driving said sprockets to move said chains in log engaging position in substantially horizontal movement to and from the peripheral surfaces of the discs of said spool or to move said logs over the periphery thereof.

6. In a log stop and kicker mechanism having a frame, a main drive shaft journaled for horizontal rotation on said frame, sprockets one at each end of said shaft fixed thereon, idler sprockets at a horizontally spaced position on said frame from said first mentioned sprockets, chain means operating over said sprockets, support means located on said frame and engaging said chains intermediate said first mentioned sprockets and said idler sprockets so as to carry a load of logs on the upper train of said chains, a log stop and kicker mechanism comprising a tubular member freely journaled on said drive shaft between said drive sprockets and said chains, log engaging discs fixed on said tubular member, and power means for reversibly actuating or stopping movement of said drive shaft and chains so as to present logs to or remove logs from said peripheral surfaces of said spool or to actuate logs over the periphery of the discs of said spool.

WILEY T. STOCKETT, JR.

References Cited in the file of this patent

UNITED STATES PATENTS

| Number | Name | Date |
|---|---|---|
| 162,088 | Miles | Apr. 13, 1875 |
| 608,888 | Curtis | July 5, 1898 |
| 896,620 | Burkett | Aug. 18, 1908 |
| 973,423 | Grabs | Oct. 18, 1910 |
| 1,426,409 | Rawson | Aug. 22, 1922 |